Jan. 14, 1958  C. E. ERIE  2,820,160
SOLENOID POWERED MOTOR
Filed Aug. 12, 1954
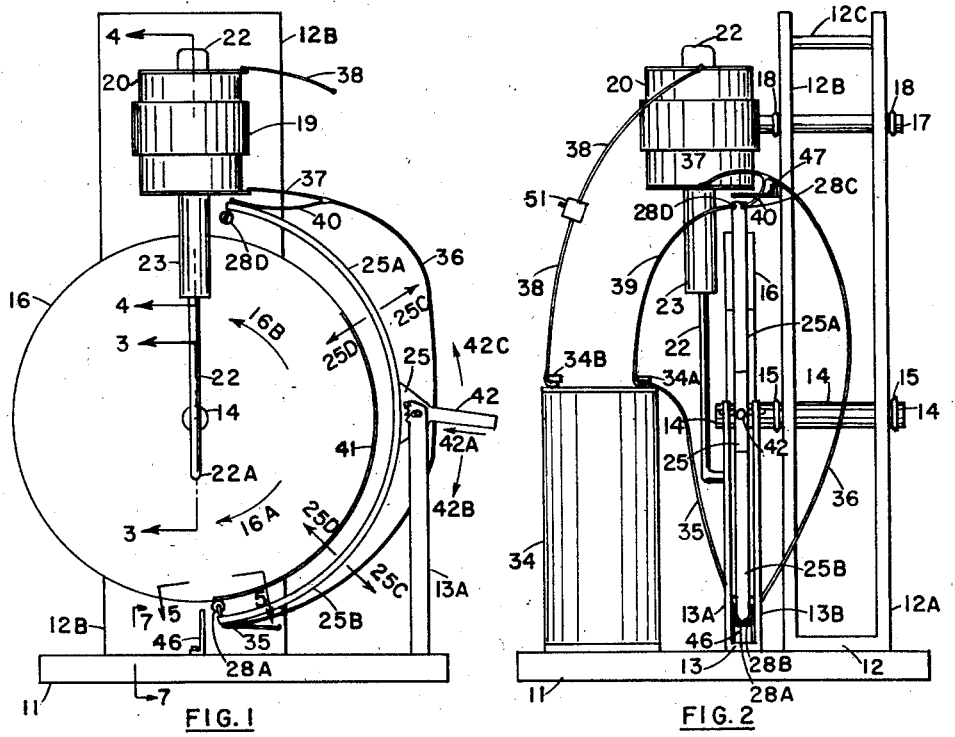
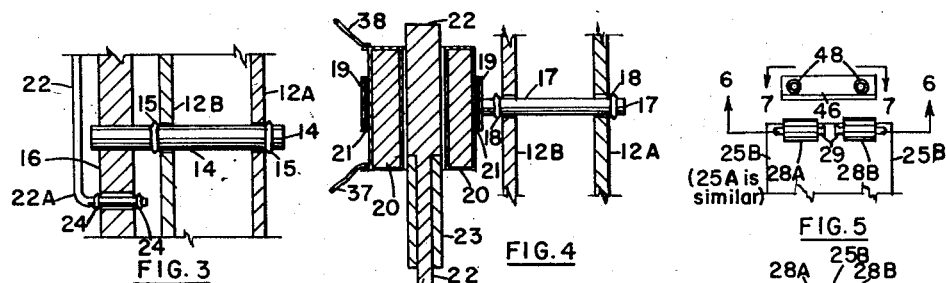
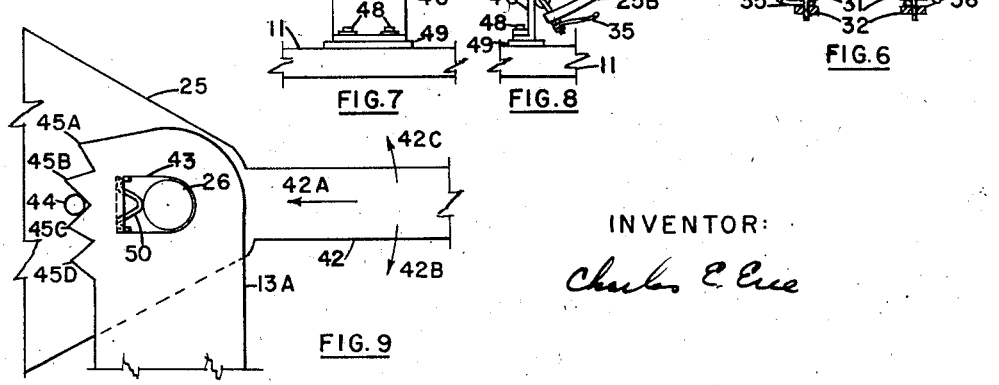
INVENTOR:
Charles E Erie United States Patent Office 2,820,160
Patented Jan. 14, 1958

2,820,160

SOLENOID POWERED MOTOR

Charles E. Erie, Mobile, Ala.

Application August 12, 1954, Serial No. 449,483

2 Claims. (Cl. 310—23)

The present invention relates to a new improvement in electric motors and forwards as its main object and purpose means whereby the conventional wheel and shaft is modified to allow power to be delivered constantly while the current used to turn the said wheel and shaft is furnished at intervals to the end that only a small portion of current is required in proportion to that required for the conventional electric motors.

The invention as shown in the drawings is designed primarily for small toys, advertising signs, or other objects requiring a small amount of power, however, the principle involved would remain the same for larger electric motors, and with the application of conventional parts such as bearings, heavier supports, larger coils, heavier power source, etc. the larger electric motors would prove as efficient as the small one depicted herein. Motors of this type would be excellent for lawn mowers, outboard motors, etc.

Electric motors of this type with more than one coil cylinder could be used to drive heavy equipment such as are now powered by diesel electric engines.

One of the most important advantages forwarded by this new invention resides in the simplicity of construction. For toys, this motor could be built primarily of plastic or light weight aluminum with the exception of the coil, part or all of the piston, the conductor parts and the wires. In this instance a light weight, low cost electric motor could be had. Very little precision work would be required. For motors to be used in heavier work metal, such as steel, could be used to form the whole motor, but even then the cost would remain comparatively low because of the fact that very few parts require precision work.

The motor shown in the drawing may be operated from a flash light battery and can use either A. C. or D. C. current. By installing a rheostat this new motor may be caused to run faster or slower as desired.

The motor shown in the drawings allows an axial movement of the coil cylinder thus eliminating the need for a connecting rod, however, the coil cylinder could be stationary and a connecting rod used instead of the type shown.

Due to the intermittent usage of electric current to operate this new motor a definite saving in electricity is had. In the case of the use of a battery the usable life would be greatly prolonged.

With these and other advantages to be forwarded as we proceed I refer to the drawing in which like parts are denoted by the same reference characters throughout the several views, whereas:

Figure 1 is a side elevational view of the new invention in electric motors.

Figure 2 is a front elevational view of same.

Figure 3 is a sectional view as taken at 3—3 in Figure 1, showing more particularly the connection of the wheel to the shaft and the piston rod.

Figure 4 is a sectional view as taken at 4—4 in Figure 1 showing more particularly the structure of the coil cylinder and its connection to the frame to allow the axial movement thereof.

Figure 5 is a plan view of the roller connectors as taken at 5—5 in Figure 1.

Figure 6 is a sectional view as taken at 6—6 in Figure 5, showing more particularly the construction of the roller connectors.

Figure 7 is a sectional view as taken at 7—7 in Figure 1 showing the contact pad used to start the motor.

Figure 8 is an end view of Figure 7.

Figure 9 is an enlarged partial elevational view of the operating fork, showing more particularly the operating mechanism thereon.

Referring more particularly to the drawing:

11 designates the base upon which is welded or otherwise attached a frame 12, said frame provided with two upright arms 12A and 12B having a brace rod 12C. A second support 13 is provided with two upright arms 13A and 13B, this support also being welded or otherwise attached to the base 11. A shaft 14 is rotatably attached to the upright arms 12A and 12B and is provided with crimps or the like 15 to prevent its removal therefrom. Welded or otherwise attached to the shaft 14 is a fly wheel 16.

Also rotatably attached to the upright arms 12A and 12B is a second shaft 17 provided with crimps or the like 18 to prevent its removal therefrom. This shaft 17 is welded or otherwise firmly attached to a clamp band 19 which encases and holds firmly a coil cylinder 20. As seen more particularly in Figure 4, the clamp band 19 is insulated from the coil cylinder 20 as indicated by the numeral 21.

A piston rod 22 is provided within the coil cylinder 20. This piston rod may be made of ferrous or non-ferrous metal or of any non-conductive material such as plastic, but if non-ferrous metal is used the piston rod 22 must be provided with a ferrous metal sleeve 23 as shown in Figure 4. This piston rod 22 is bent at point 22A and is rotatably attached to the flywheel 16 as shown more clearly in Figure 3. Crimps 24 on the rod 22 prevent it removal from the fly wheel 16.

Attached within the upright arms 13A and 13B is an operating fork 25 provided with a pin 26 which may be flattened on each end to prevent its removal from the upright arms 13A and 13B, thus providing an attaching means therefor in a manner to allow the fork 25 to be moved in the directions as indicated by the arrows 25C and 25D when the handle 42 is moved upward or downward. This fork 25 is provided with arms 25A and 25B, having attached thereon, as seen more particularly in Figures 5 and 6, contact rollers or brushes 28 rotatably attached to an L-shaped rod 29 which is attached to the arms 25A or 25B by means of nuts 30, 31, and 32. Insulation is provided around the rods 29 to prevent their contact with the arms 25A and 25B. The unattached ends of the rods 29 are flattened or otherwise provided with means to prevent the removal of the contact rollers 28A, 28B, 28C, and 28D. Insulation indicated by numeral 33.

The operation of this fork 25 is shown more clearly in Figure 9. A spring 50 is attached in any acceptable manner within the hole 43 placed in upright arms 13A and 13B, said hole also receiving a pin 26 which is attached to the fork 25. A second pin 44 is attached to the fork 25 at a point on the axis of the handle 42 to allow the pin 44 to be optionally placed between any two of the teeth 45A, 45B, 45C and 45D. These teeth are so positioned on the upright arm 13A or 13B, or both if desired, that when the pin 44 is placed between the teeth 45A and 45B the contact rollers 28A and 28B will contact the wheel 16. When the pin 44 is placed between the teeth 45C and 45D the contact rollers 28C and 28D will contact the wheel 16, and if the pin 44 is placed between the teeth 44B and 44C none of the contact rollers will touch the wheel 16 and the motor will be in neutral.

Since the wheel 16 is not balanced, it is possible that when in neutral it will stop in a position that will not allow the contact rollers to touch the conductor band 41, which attached in any approved manner to a part of the rim of the fly wheel 16, thus allowing the motor to remain in neutral. To allow this new motor to be started at any position a conductor pad 46 is attached to the base 11, and a conductor pad 47 is attached to the upright arm 12B. As seen more clearly in Figures 7 and 8, the conductor pad 46, which is identical to conductor pad 47, is merely a piece of copper or similar material which is attached to the base 11 (or in the case of conductor pad 47 to the upright arm 12B) by means of insulated screws, bolts or the like 48. An insulation pad 49 is provided to completely insulate the conductor pads. Since the current must pass from one contact roller to the adjacent contact roller to complete the circuit thus centering the ferrous metal sleeve 23 within the coil cylinder, the contact pad 46 or 47, as the case may be, serves this purpose when the handle 42 is pushed in the direction of arrow 42A and moved to allow the pin 44 to be placed either between the teeth 45A and 45B or between the teeth 45C and 45D. This push in the direction of arrow 42A will allow one set of the contact rollers to touch the contact pad adjacent to them, depending upon which set is being utilized, and the circuit will be momentarily completed allowing the wheel 16 to rotate enough to allow the contact rollers to contact the conductor band 41. The spring 50 pushing against the pin 26 causes the pin 44 to be held in position between the desired teeth when the handle 42 is released and the motor will operate until the pin 44 is positioned in neutral, or the switch 51 is turned off.

A battery 34 is shown positioned on the base 11 of the invention to which are attached wires 35, 38, and 39; wire 38 being attached between one pole 34B of the battery 34 and the top of the coil cylinder 20 and having therein a switch 51. Wire 39 and wire 35 are attached to pole 34A of the battery 34, wire 39 having its other end attached to the contact roller 28D while wire 35 has its other end attached to the contact roller 28A. A wire 36 is attached to the contact roller 28B and a wire 40 is attached to the contact roller 28C, both of these wires being attached to a wire 37 which is also attached to the bottom of the coil cylinder 20.

Actually two circuits are provided in this method of wiring. The first circuit is provided by wires 35, 36, 37, and 38 when the contact rollers 28A and 28B contact either the conductor pad 46 or the conductor band 41. The second circuit is provided by wires 39, 40, 37, and 38 when the contact rollers 28C and 28D contact either the conductor pad 47 or the conductor band 41.

Since electric current follows the path of least resistance the connection of wires 36 and 40 to the wire 37 will in no way effect the operation of the circuits in the proper manner. In like manner the wheel 16 will be caused to move clockwise as indicated by arrow 16A by the operation of the first circuit described above, and will move counter-clockwise as indicated by the arrow 16B by the operation of the second circuit described above.

The wheel 16 is made of nonconductive material and is therefore not a conductor of electric current. To complete the circuits provided by the wires mentioned above a band 41 of conductive material is attached to approximately one-third of the perimeter of the wheel 16. When the contact rollers 28A and 28B touch the conductor band 41 a complete circuit is had and the ferrous metal sleeve 23 on the piston rod 22, being attracted by the coil 20 is centered therein. This causes the wheel 16 to rotate and as the contact rollers 28A and 28B pass the conductor band 41 the circuit is broken and momentum, together with the weight of the piston rod, carries the fly wheel around until the contact rollers 28A and 28B can again touch the conductor band 41 thereby again completing the circuit and starting the cycle over again. This causes the fly wheel to turn in the direction of arrow 16A. To allow the fly wheel 16 to rotate in the opposite direction the contact rollers 28C and 28D are caused to touch the conductor band 41 thus turning the wheel 16 in the direction of arrow 16B.

To describe the operation more concisely, the handle 42 is pushed in the direction of arrow 42A and moved either in the direction of arrow 42B or 42C which will cause the proper set of contact rollers 28 to touch the conductor pad 46 or 47 adjacent thereto thus completing the desired circuit. This will cause the coil 20 to be activated and will attract the ferrous metal sleeve 23 on the piston 22 centering it within the coil momentarily and causing the wheel 16 turn to the proper position to allow the contact rollers to touch the conductor band 41 on the wheel 16. The handle 42 is only momentarily pushed in the direction of arrow 42A and is released in the position to allow the desire contact rollers to be utilized. When released, the handle 42 will be held in position through means described above and the invention will remain in continuous operation until either the switch 51 is turned off or the handle 42 is again adjusted either to neutral or to allow the use of the second set of contact rollers 28. It is understood, of course, that the proper proportions and positions between the various parts must be had to allow the proper and efficient operation of the invention. It is also understood, of course, that the parts used to complete the circuits must be insulated from the rest of the motor, especially if conductive material is used for parts which are not part of the circuits.

While I have disclosed herein the best form of the invention known to me at the present time I desire it to be understood that I reserve the right to make alterations and changes insofar as such alterations and changes are covered by the appended claims.

I claim:

1. In an electric motor, a coil cylinder, said coil cylinder provided with a rotatable shaft attached to one side thereof, said shaft provided with supporting means, a piston working within said coil cylinder, said piston composed of non-conductive material but provided with a sleeve of conductive material on a predetermined length of said piston, a flywheel connected to said piston, said flywheel composed of non-conductive material, a thin layer of conductive material attached to a predetermined portion of the rim of said fly wheel, a shaft of non-conductive material firmly attached within the center of said fly wheel, means provided to support said shaft, a semi-circular shaped operating fork provided with a support, being attached movably therein, said semi-circular shaped fork positioned to encase but not touch one half of the said fly wheel, each end of said semi-circular shaped fork provided with two rollers of conductive material attached adjacent one to the other but not in contact therewith, insulation means provided between the said semi-circular shaped fork and the said rollers, means provided on the said semi-circular shaped fork to allow it to be moved closer to said fly wheel, means also provided to allow the said rollers on either end of the said semi-circular shaped operating fork to touch the rim of the said fly wheel when desired, means also provided to hold the said semi-circular shaped operating fork in a desired position, a battery, a wire connecting one pole of said battery to one end of the said coil cylinder, wires connecting the opposite pole of said battery to one contact roller on each end of said semi-circular shaped operating fork, and wires connecting the second contact roller on each end of said semi-circular shaped operating fork to the opposite end of said coil from the end provided with the wire connecting the coil and the battery, and means provided whereby current is caused to activate the said coil through the contact of the said rollers on the conductor rim of the said fly wheel to the end that the wheel rotates as to current is intermittently applied through the closed and opened circuits.

2. In an electric motor, a combination of parts made of non-conductive material comprising a base, supports, a fly wheel, a shaft, a piston, and a work-shaped operating bar, said electric motor also provided with a magnetic conductive part comprising a sleeve of predetermined length fixedly mounted on said piston, conductive material parts consisting of a pad of predetermined length fixedly attached on a portion of the circumferential edge of said fly wheel, two rollers separately attached at each end of said fork-shaped operating bar, a coil fixedly positioned within said coil cylinder, and wires connecting these conductive material parts together, one of said wires connecting the top of said coil to one wire of the power source, a second wire connecting the bottom of said coil to one of the two rollers on each end of said fork-shaped operating bar, a third wire connecting the second of the two said rollers at each end of the said fork-shaped operating bar to the second wire of the power source, means provided to allow the two rollers on one end of said fork-shaped operating bar to contact the pad of conductive material on the edge of said fly wheel at a predetermined time and location of allow the wheel to operate in a forward manner, means provided to allow the two rollers on the second end of said fork-shaped operating bar to contact the pad of conductive material on the edge of said fly wheel at a predetermined time and location to allow the fly wheel to operate in a reverse manner, the contact of said rollers with the pad of conductive material on the edge of said fly wheel closing the particular circuit involved, activating the coil and causing the sleeve of magnetic conductive material on said piston to be centered momentarily within the said coil, means provided to start the rotation of said fly wheel when the rollers on either end of the fork-shaped operating bar are not in contact with the conductive material pad affixed to the edge of said fly wheel, and means also provided to stop said motor.

References Cited in the file of this patent
UNITED STATES PATENTS

| | | |
|---|---|---|
| 323,652 | Farmer | Aug. 4, 1885 |
| 538,351 | Sabin | Apr. 30, 1895 |
| 1,291,819 | Fogel | Jan. 21, 1919 |
| 1,356,290 | Kellum | Oct. 19, 1920 |
| 1,721,447 | Haney | July 16, 1929 |